United States Patent [19]

Endo et al.

[11] Patent Number: 4,700,764

[45] Date of Patent: Oct. 20, 1987

[54] HEAVY DUTY PNEUMATIC RADIAL TIRES

[75] Inventors: Kazuyuki Endo, Kokubunji; Motoaki Taniguchi, Higashiyamato; Masanobu Takahashi, Iruma; Shigeki Yamada, Nishitama; Kenshiro Kato, Kodaira, all of Japan

[73] Assignee: Bridgestone Corporation, Tokyo, Japan

[21] Appl. No.: 826,159

[22] Filed: Feb. 4, 1986

[30] Foreign Application Priority Data

Feb. 5, 1985 [JP] Japan .................................. 60-19187

[51] Int. Cl.$^4$ .......................... B60C 9/20; B60C 9/08; B60C 15/06

[52] U.S. Cl. ..................................... 152/526; 57/902; 152/531; 152/541; 152/543; 152/546; 152/552; 152/560; 244/103 R

[58] Field of Search ............... 152/541, 543, 546, 547, 152/556, 560, 526, 527, 531, 450, 451, 548, 552; 57/902; 244/103 R

[56] References Cited

U.S. PATENT DOCUMENTS

| | | |
|---|---|---|
| 3,961,657 | 6/1976 | Chrobak .......................... 152/546 X |
| 4,046,183 | 9/1977 | Takahashi et al. .............. 152/546 X |
| 4,289,184 | 9/1981 | Motomura et al. ............. 152/546 X |

Primary Examiner—Donald E. Czaja
Assistant Examiner—Thomas Bokan
Attorney, Agent, or Firm—Sughrue, Mion, Zinn Macpeak & Seas

[57] ABSTRACT

A heavy duty pneumatic radial tire for use in airplanes and the like is disclosed, which comprises a toroidal radial carcass, a belt superimposed about a crown region of the carcass and composed of at least three cord layers, and a bead portion reinforcement consisting of a stiffener composed of a hard rubber stock and a soft rubber stock, a main chafer made from aromatic polyamide fiber cords, and an auxiliary chafer of at least two cord layers covering the outside of said main chafer and at least one cord layer arranged along the inside of the turnup portion as an inner cord layer, and having such a triangular truss structure that cords of at least two cord layers are arranged at inclination angles of 65°~90° and 35°~55° with respect to the meridional plane of the tire, respectively, and cords of the remaining cord layer are arranged at an inclination angle of −50°~70° with respect to the meridional plane.

5 Claims, 10 Drawing Figures

FIG_2
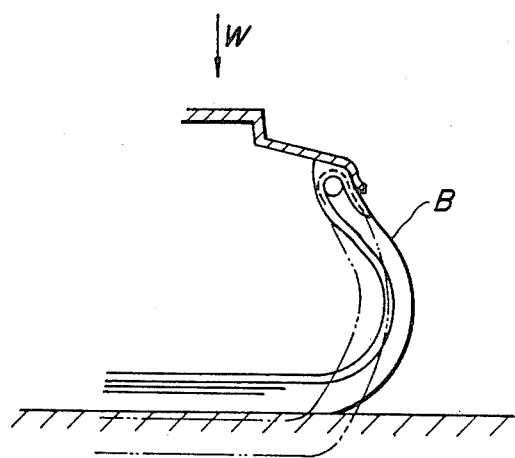
FIG_3
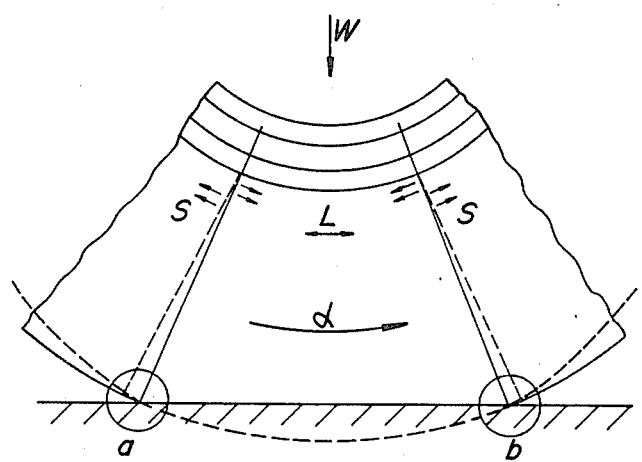

HEAVY DUTY PNEUMATIC RADIAL TIRES

BACKGROUND OF THE INVENTION

1. Field of the Invention

This invention relates to a heavy duty pneumatic radial tire. In particular, this invention relates to an improvement of service durability in the bead portion of a heavy duty pneumatic radial tire for use in an airplane wheel or the like which is forcedly subjected to large longitudinal deformation during the running under a heavy loading, for example, in the taxiing of an airplane.

2. Related Art Statement

In this type of pneumatic radial tire, a toroidal carcass ply is wound around a bead core from the inside of the tire toward the outside thereof to form a turnup portion in the bead portion, and the reinforcement of the bead portion is generally performed by embedding a stiffener, a main chafer and two auxiliary chafers in a bead portion rubber. In this case, the stiffener is disposed between the carcass ply and its turnup portion and consists of a base portion placed on the bead core and made of hard rubber stock and a thickness-reducing portion integrally united with the base portion and made of soft rubber stock. Further, the main chafer is arranged outside the carcass to extend from a lever lower than the upper end of the turnup portion along the turnup area of the carcass ply toward the inside of the tire, while the auxiliary chafer has a modulus of elasticity lower than that of the main chafer and is extended downward from a level higher than the upper end of the turnup portion so as to cover the upper end of the turnup portion and one end of the main chafer. Moreover, the two auxiliary chafers may be arranged outside the main chafer to sandwich the upper end of the turnup portion and one end of the main chafer therebetween, wherein the cords of the auxiliary chafers are crossed with each other at the same inclination angle with respect to the meridional plane of the tire.

Since longitudinal deflection of the tire is conspicuous in the taxiing of the airplane, a large deformation is forced to the bead portion. In the aforementioned conventional bead portion reinforcement, therefore, it has been confirmed that fatigue accumulates in the bead portion due to the repeated bending stress during the rotation of the tire at ground contact area and the separation failure frequently occurs in the boundary between the carcass turnup portion and the rubber surrounding therearound. Up to the present, countermeasures for solving this problem are still under examination, but a proper countermeasure has not been found.

SUMMARY OF THE INVENTION

It is, therefore, an object of the invention to provide a reinforcement structure of a bead portion in heavy duty pneumatic radial tires for use in airplanes and the like which can advantageously improve and enhance the service durability of the bead portion resulting from the accumulation of fatigue due to the largely forced deformation produced by the highly longitudinal deflection which is about two or more times larger than that of the usual truck and bus tires.

According to the invention, there is the provision of a heavy duty pneumatic radial tire comprising a toroidal carcass composed of at least one cord ply containing aromatic polyamide fiber cords arranged parallel with each other in a direction substantially perpendicular to the equatorial plane of the tire and wound around a bead core from the inside of the tire toward the outside thereof to form a turnup portion, a belt superimposed about a crown region of the carcass and composed of at least three cord layers, and a bead portion reinforcement consisting of a stiffener disposed between the carcass and its turnup portion and composed of a base portion of relatively hard rubber stock contacting with the bead core and a thickness-reducing portion of a relatively soft rubber stock integrally united with the base portion, a main chafer extending from a level lower than an upper end of the turnup portion along the turnup region of the carcass toward the inside of the tire and made from aromatic polyamide fiber cords, and a plural layer auxiliary chafer made from cords having a modulus of elasticity lower than that of the main chafer and extending radially inwardly downward from a radially outward level higher than the upper end of the turnup portion so as to overlappedly cover the upper end thereof and one end of the main chafer, the improvement wherein said auxiliary chafer is composed of at least two cord layers covering the outside of said main chafer, among which at least one cord layer being an outer cord layer wound along the turnup region toward the inside of the tire, and at least one cord layer arranged along the axial inside of the turnup portion as an inner cord layer, and has a triangular truss structure using a nodal point between the cord layers as a vertex that cords of at least two cord layers among said at least three cord layers in total are arranged at inclination angles of $65° \sim 90°$ and $35° \sim 55°$ with respect to the meridional plane of the tire, respectively, and cords of the remaining cord layer are arranged at an inclination angle of $-50° \sim 70°$ with respect to the meridional plane.

In the preferred embodiment of the invention, the inner cord layer is terminated at a level lower than one end of the main chafer, and each of the cord layers constituting the auxiliary chafer is made of aliphatic polyamide fiber cords.

BRIEF DESCRIPTION OF THE DRAWINGS

FIGS. 2 and 3 are schematic views illustrating the deformation behavior of the tire, respectively;

DESCRIPTION OF THE PREFERRED EMBODIMENTS

Figure 1:
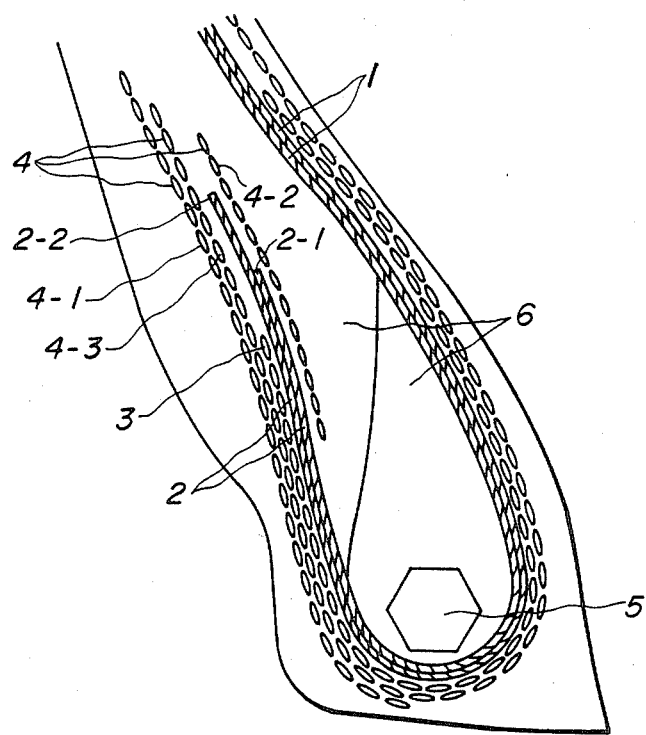
FIG. 1 is a schematically sectional view of a main part of the heavy duty pneumatic radial tire according to the invention.

FIG. 1 illustrates the bead portion of the heavy duty pneumatic radial tire according to the invention as a meridional section thereof. In FIG. 1, numeral 1 is a carcass composed of two plies in the illustrated embodiment, numeral 2 turnup portions of these carcass plies, numeral 3 a main chafer, numeral 4 an auxiliary chafer composed of three cord layers in the illustrated embodiment, numeral 5 a bead core, and numeral 6 a stiffener composed of hard and soft rubber stocks.

It is a matter of course that a belt (not shown) composed of at least three cord layers is superimposed about a crown region of the carcass 1 in accordance with custom in order to reinforce a tread portion extending from the bead portion through a sidewall.

When such a pneumatic radial tire is subjected to the longitudinal deformation just under a loading W as illustrated in FIG. 2, there is clearly added a bending deformation B so that the bead portion falls outwardly from a phantom line to a solid line. This produces a tensile stress as shown by an arrow L in FIG. 3. On the other hand, the deformation of the ground contact area of the tread portion ranging from a step-in side a to a kick-out side b during the rotation of the tire shown by an arrow α causes a shearing stress S to the bead portion fixed to a rim.

Since these stresses L and S are dependent upon the loading W, it is necessary to enhance resistance to these stresses, i.e. tensile and shearing rigidities in the application of the tire to airplanes or the like.

Figure 4:
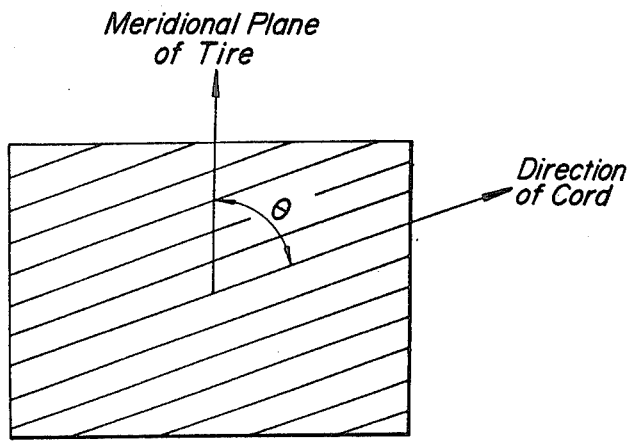
FIG. 4 is a schematic view showing the arrangement of cords.
Figure 5A:
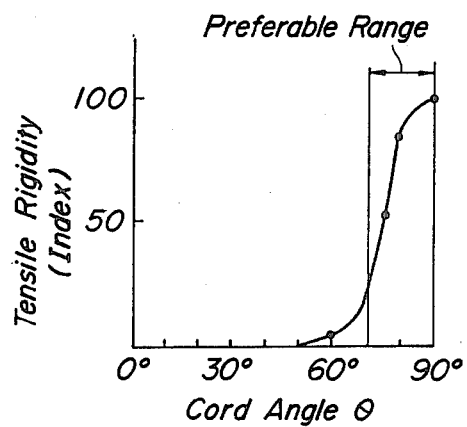
FIGS. 5a and 5b are graphs showing an influence of cord angle on tensile and shearing rigidities, respectively.
Figure 5B:
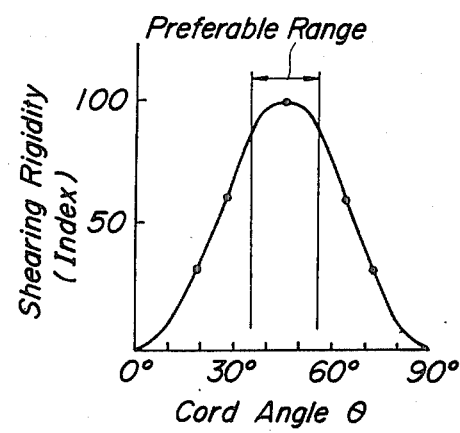

When the cord angle of the auxiliary chafer effecting the enhancement of these rigidities is defined by an inclination angle $\theta$ with respect to the meridional plane of the tire as shown in FIG. 4, it has been elucidated from many investigations that the tensile rigidity is advantageously enhanced as the cord angle $\theta$ becomes larger as shown in FIG. 5a. The shearing rigidity is enhanced as the cord angle becomes smaller as shown in FIG. 5b.

Figure 6A:
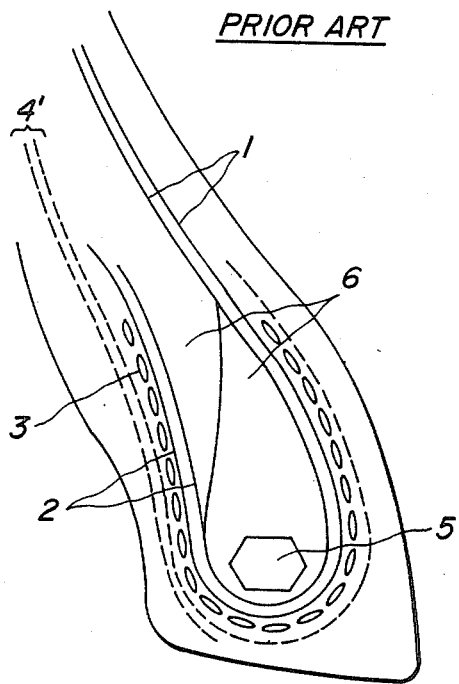
FIGS. 6a and 6b are schematically sectional views of main parts of the conventional tires, respectively.
Figure 6B:
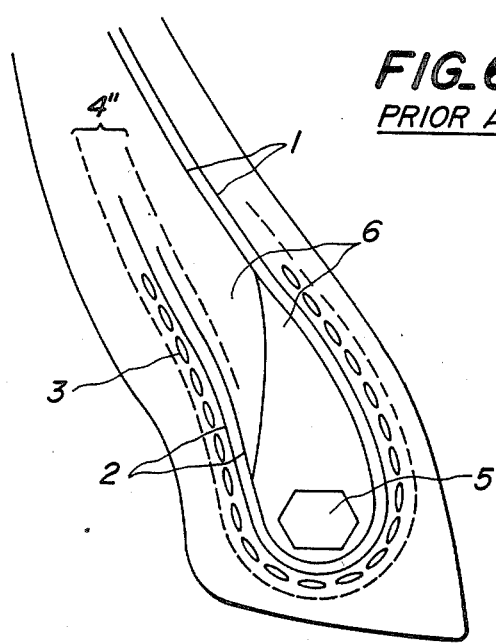
Figure 7:
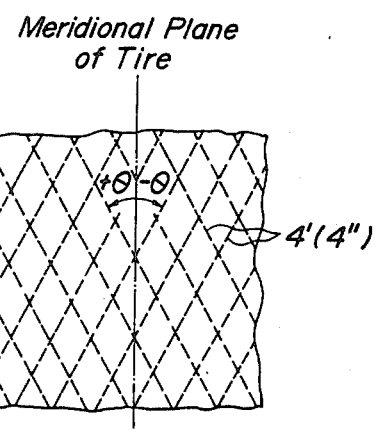
FIG. 7 is a schematic view illustrating the arrangement of cords in the auxiliary chafer of the conventional tire.

In this connection, when the two cord layers as shown in FIG. 6a or 6b are arranged as two auxiliary chafers 4' or 4'' to cross the cords of these layers with each other at the same inclination angle with respect to the meridional plane of the tire in the conventional manner, the network structure defined among cords of the two cord layers forms a lozenge as shown in FIG. 7. This causes the pantagraph movement thereof, which does not serve to enhance the tensile rigidity, and also the cord angle itself is frequently unsuitable.

According to the results of the above mentioned investigations, the enhancement of tensile and shearing rigidities can advantageously be realized by constituting the auxiliary chafer with at least three cord layers having three different cord angles which effectively contribute to surely enhance both the rigidities.

That is, according to the invention, the auxiliary chafer 4 is composed of three cord layers as shown in FIG. 1 and has a triangular truss structure with the cords of a first cord layer among the above three cord layers are arranged at an inclination angle of 65°~90° with respect to the meridional plane of the tire and the cords of a second cord layer are arranged at an inclination angle of 35°~55° with respect to the same meridional plane to enhance the tensile and shearing rigidities, while the cords of the remaining third cord layer are arranged at an inclination angle of −50°~−70° with respect to the meridional plane in a direction opposite to the cord direction of the first and second cord layers. Particularly, the turnup portion and the main chafer are interposed between the outer cord layer and the inner cord layer in the auxiliary chafer. This serves to control not only the deformation of the ends of the turnup portion and the main chafer but also the growth of the end separation accompanied therewith.

The following example is given as an illustration of the invention and is not intended as limitation thereof.

Figure 8:
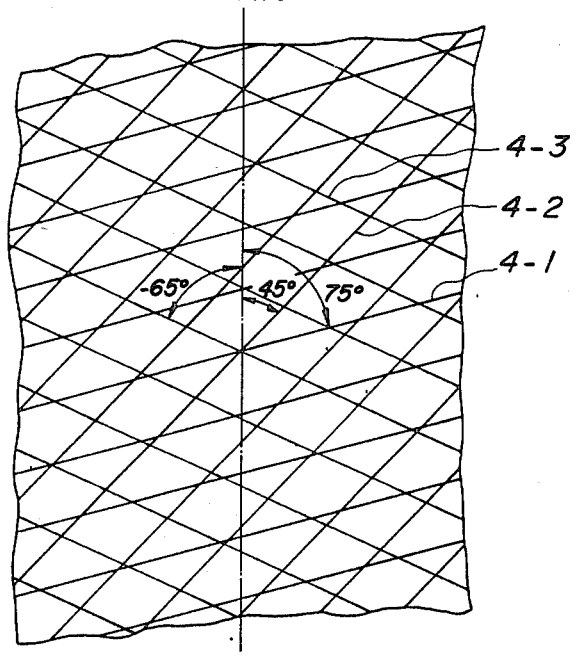
FIG. 8 is a schematic view illustrating the arrangement of cords in the auxiliary chafer according to the invention.

A tire having a tire size of H46×18.0 R20 according to the invention was manufactured, which comprised a tread portion reinforcement comprising a radial carcass of two rubberized plies each containing aromatic polyamide fiber cords (3,000 d/3) therein and a belt superimposed about a crown region of the carcass and composed of five cord layers each containing aromatic polyamide fiber cords (3,000 d/3) wherein the cords of the second and fourth cord layers were crossed with each other at an inclination angle of 23° with respect to the equatorial plane of the tire and the cords of the remaining cord layers were arranged substantially parallel with the equatorial plane. Further, this tire was comprised of the bead portion reinforcement as shown in FIG. 1, wherein the main chafer 3 was composed of aromatic polyamide fiber cords (3,000 d/3) arranged upward to the right at an inclination angle of 60° with respect to the meridional plane, and the auxiliary chafer 4 was composed of an outer cord layer 4-1 and an inner cord layer 4-2 containing nylon cords (1,260 d/2) arranged upward to the right at inclination angles of 75° and 45° with respect to the meridional plane of the tire, respectively, and a middle cord layer 4-3 containing nylon cords arranged upward to the left at an inclination angle of −65° with respect to the meridional plane as shown in FIG. 8.

In such a tire, the stepwise difference between the upper ends 2-1 and 2-2 of the turnup portions 2 in the carcass 1 was about 15 mm, the stepwise difference between the end 2-1 of the turnup portion and the one end of the main chafer 3 was about 15 mm, and the stepwise differences between the upper ends of the cord layers 4-1 and 4-3 and between the upper ends of the cord layers 4-3 and 4-2 were approximately equal to that between the upper end of the cord layer 4-2 and the uppermost end 2-2 of the turnup portion and was about 10 mm. Moreover, the turnup height of the carcass 1 was 81 mm.

On the other hand, the comparative tires shown in FIGS. 6a and 6b had the same structure as described above, except that the main chafer 3 was composed of steel cords (twisting construction: 1×3+9+15+1) and the auxiliary chafer 4' or 4'' was composed of two cord layers containing nylon cords (1,260 d/2) arranged upward to the right and left at the same inclination angle of 55° with respect to the cord of the carcass 1, respectively.

The test tires were subjected to a drum test wherein the tire was run at an internal pressure of 15.2 kg/cm$^2$ under a loading of 18.8 tons over a distance of 1,000 km, and thereafter the length of crack produced at the cord end of the turnup portion was measured. As a result, when the result of the comparative tire shown in FIG. 6a was 100 as an index, the result of the tire shown in FIG. 6b was 84. The result of the tire according to the invention was 28 which exhibits the remarkable reduction of crack length.

As mentioned above, according to the invention, the service durability of the bead portion can advantageously be enhanced under the peculiar deformation behavior of the heavy duty pneumatic radial tire causing a considerably large longitudinal deflection in use.

What is claimed is:

1. In a heavy duty pneumatic radial tire with an improved service durability of the bead portion comprising a toroidal carcass composed of at least one cord ply containing aromatic polyamide fiber cords arranged parallel with each other in a direction substantially perpendicular to the equatorial plane of the tire and wound around a bead core from the inside of the tire toward the outside thereof to form a turnup portion, a belt superimposed about a crown region of the carcass and composed of at least three cord layers, a bead portion reinforcement consisting of a stiffener disposed between the carcass and its turnup portion and composed of a base portion of relatively hard rubber stock contacting with the bead core and a thickness-reducing portion of a relatively soft rubber stock integrally united with the base portion, a main chafer extending from a level lower than an upper end of the turnup portion along the turnup region of the carcass toward the inside of the tire and made from aromatic polyamide fiber cords, a plural layer auxiliary chafer made from cords having a modulus of elasticity lower than that of the main chafer and extending radially inwardly downward from a radially outward level higher than the upper end of the turnup portion so as to overlappedly cover the upper end thereof and one end of the main chafer, said auxiliary chafer composed of at least two cord layers covering the outside of said main chafer, among which at least one cord layer being an outer cord layer wound along the turnup region toward the inside of the tire, and at least one cord layer arranged along the axial inside of the turnup portion as an inner cord layer and the auxiliary chafer has a triangular truss structure using a nodal point between the cord layers as a vertex that cords of at least two cord layers among said cord layers of said auxiliary chafers arranged at inclination angles of 65°–90° and 35°–55° with respect to the meridional plane of the tire, respectively, and cords of the remaining cord layer of said auxiliary chafer are arranged at an inclination angle of $-50°\sim-70°$ with respect to the meridional plane.

2. The tire according to claim 1, wherein said inner core layer is terminated at a level lower than one end of said main chafer.

3. The tire according to claim 1, wherein said auxiliary chafer is made from aliphatic polyamide fiber cords.

4. The tire according to claim 1, wherein cords of said belt are aromatic polyamide fiber cords.

5. The tire according to claim 1, wherein cords of the cord layers in said auxiliary chafer are crossed with each other.

* * * * *